Oct. 21, 1941. E. H. BLATTNER 2,259,608
SIDE BEARING
Filed July 1, 1940 2 Sheets-Sheet 1

Inventor
Emil H. Blattner

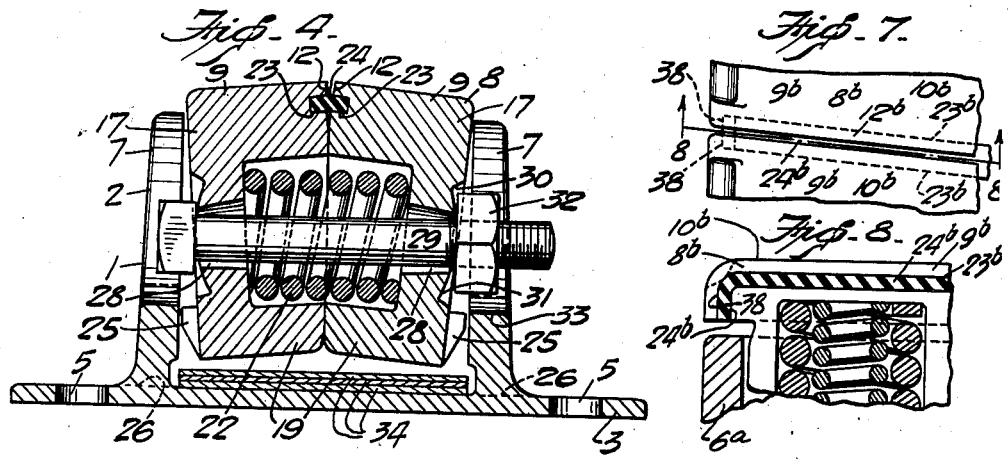
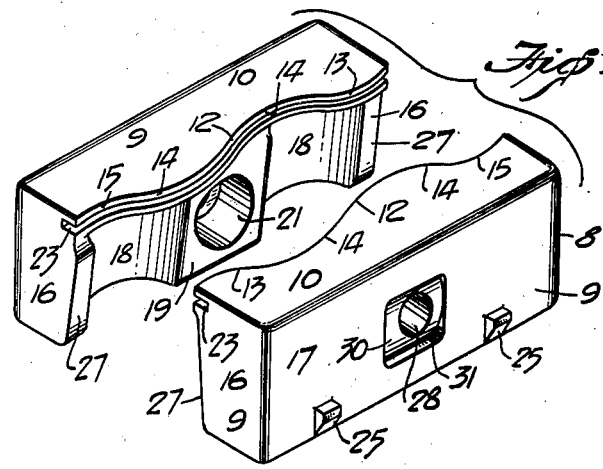
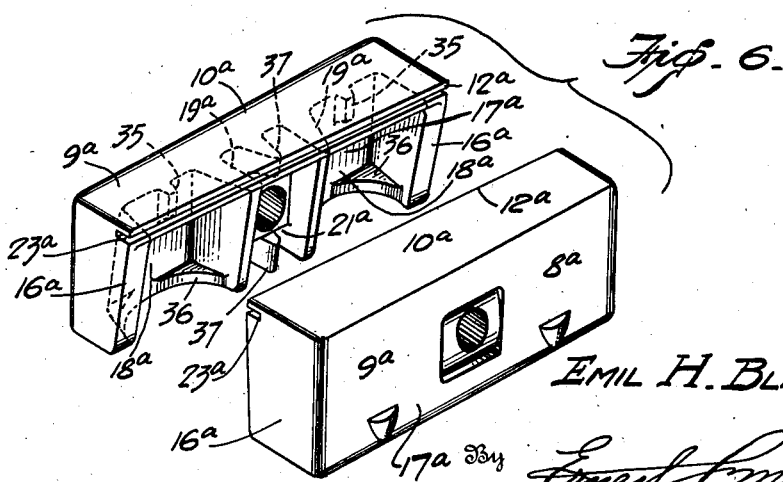

Patented Oct. 21, 1941

2,259,608

UNITED STATES PATENT OFFICE 2,259,608

SIDE BEARING

Emil H. Blattner, Rochester, N. Y., assignor to The Symington-Gould Corporation, Rochester, N. Y., a corporation of Maryland Application July 1, 1940, Serial No. 343,481

20 Claims. (Cl. 308—138)

The invention relates to a side bearing adapted to be interposed between two relatively movable parts of a railway vehicle.

An object of the invention is to provide a side bearing capable of resiliently resisting the approaching movement of relatively movable parts of a railway vehicle.

Another object of the invention is to provide a side bearing of a compressible type and having its parts so arranged and constructed that frictional forces will be created therein to form a side bearing of predetermined capacity.

A further object of the invention is to provide a side bearing of relatively few parts which is positive in action, durable in service and adjustable in height.

A feature of the invention is the provision, in a side bearing, of a multipart cap positioned in and extending above a housing with spring means within the side bearing for urging the cap outwardly of the housing and the parts of the cap away from one another into frictional engagement with the housing.

An added feature of the invention is the provision, in a side bearing, of a multipart or counterpart cap having bearing plates, the contiguous edges of which pass through or intersect a vertical plane passing through the longitudinal axis of the side bearing.

A further feature of the invention is the provision, in a side bearing, of a multipart cap having counterpart bearing plates with a flexible means associated with contiguous edges thereof to form a seal therebetween.

Still another feature of the invention is the provision, in a side bearing, of an upwardly opening housing, a multipart cap having means formed integral therewith and outstanding therefrom so that an assembled cap, inclusive of the integral means, will have a horizontal extent greater than the housing opening; the cap parts being so arranged and constructed that they may be temporarily abnormally associated to facilitate assembly of the cap and housing and permit the cap integral means to be positioned in accommodating housing apertures.

The above objects and features as well as numerous others will become apparent from the accompanying drawings which disclose exemplified forms of the invention and wherein:

Figure 4 is a view taken along the transverse center line of the side bearing of Figure 1, showing portions thereof in an abnormal relation during the process of assembly or disassembly of the side bearing.

Figure 5 is a perspective view of a cap removed from an assembled side bearing to more clearly illustrate the cap construction of Figure 1.

Figure 6 is a perspective view of a modification of the cap shown in Figures 1 to 5, inclusive.

Figure 7 is a plan view of a further modification of the cap shown in Figures 1 to 5, inclusive.

Figure 8 is a sectional view taken along the lines 8—8 of Figure 7, looking in the direction of the arrows.

Figure 1:
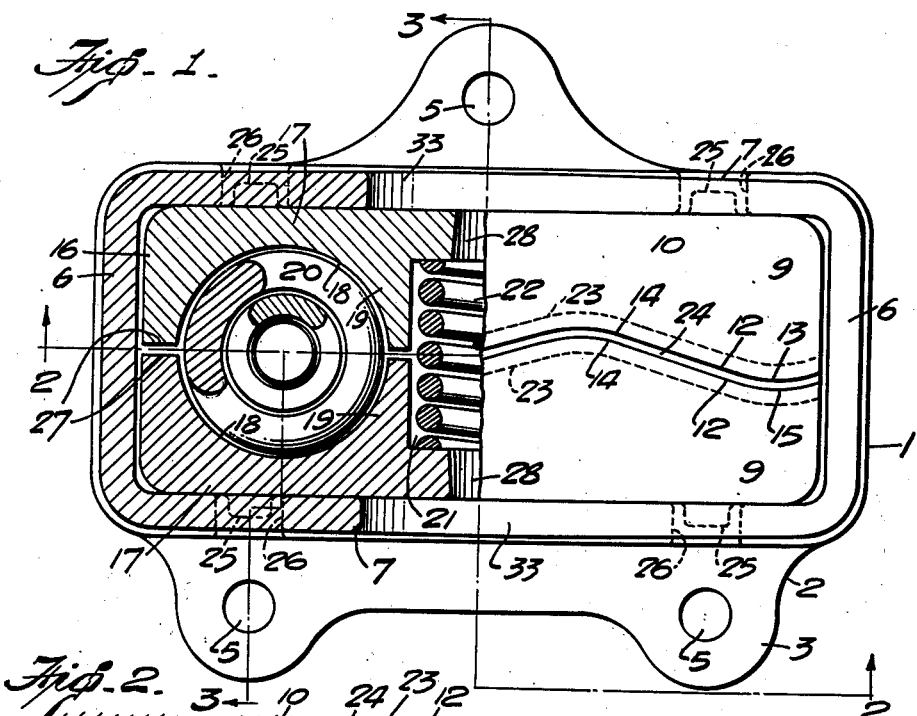
Figure 1 is a partial horizontal sectional and partial plan view of a species of a side bearing embodying the present invention.
Figure 2:
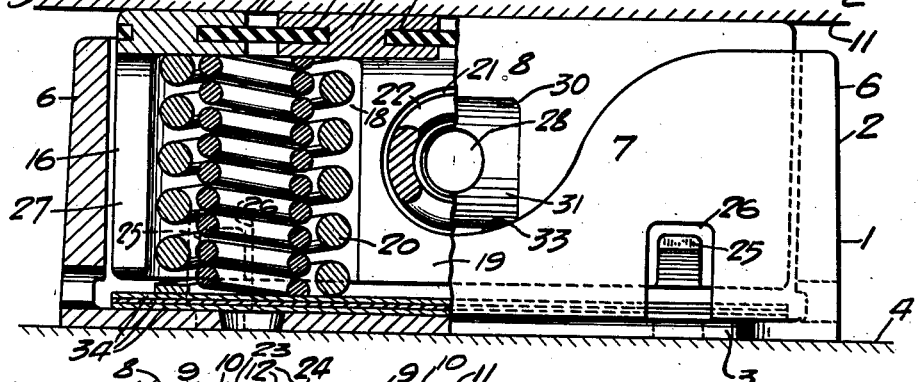
Figure 2 is a partial vertical sectional and partial side elevational view of a side bearing taken along the lines 2—2 of Figure 1, looking in the direction of the arrows.
Figure 3:
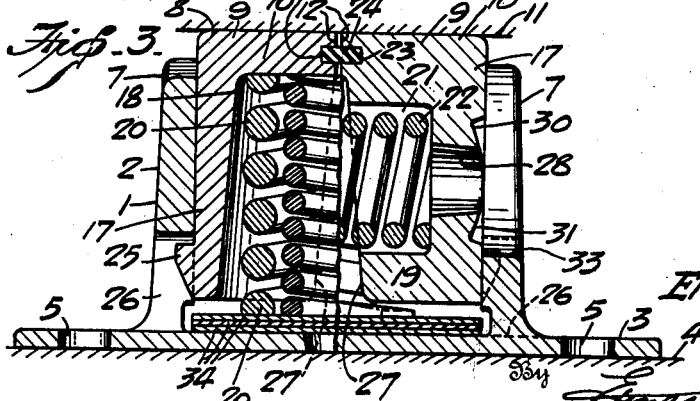
Figure 3 is a transverse sectional view of the side bearing of Figure 1 taken along the lines 3—3 thereof, looking in the direction of the arrows.

Referring now in detail to the drawings and particularly Figures 1 through 5 thereof, wherein like reference characters designate like parts, the numeral 1 is employed to indicate, in a general manner, a side bearing illustrative of the present invention and of a type capable of compressing or expanding within certain predetermined limits to cushion, control or snub the movement of a pair of associated relatively movable bolster or load carrying members of a railway vehicle (not shown).

The side bearing is formed in part by a housing 2 comprising a lower or base plate 3 adapted to bear upon or be supported by a truck bolster, only a top surface 4 of which is shown. The base plate is provided with apertures 5 positioned adjacent the transverse limits thereof for the accommodation of any type of means to secure the side bearing to the truck bolster. Upstanding from the base plate are longitudinally spaced end walls 6 joined by transversely spaced side walls 7 to form an upwardly facing or opening receptacle.

Positioned in the housing is a cap 8 having a portion thereof projecting above the upper extremities of the housing walls in order to allow a downward movement of the cap during a compressive movement of the side bearing. The cap, which is capable of moving vertically relative to the housing, is formed of a plurality of, preferably two, sections 9, each being a counterpart of another, and for this reason only one type of section need be manufactured since a plurality of sections, properly assembled, will form a single unitary cap. Each cap section comprises an upper or bearing plate 10 adapted to bear against a body bolster, of which only a lower surface 11 is indicated. The side bearing is positioned adjacent the extremities of the body and truck bolsters, and since the bolsters pivot relatively to one another about a common axis located at the longitudinal center line of the railway vehicle or a point midway between the bolster extremities, the side bearings are, during service, urged along an arcuate path about the above-mentioned common axis when the vehicle with which they are associated traverses a curve. It has also been found by exhaustive tests that when a railway vehicle is traveling along a straight track, the trucks of the vehicle have a tendency to nose or pivot about their connection with the vehicle body to thereby follow a somewhat sinuous path. When such motions are set up in a railway truck the side bearings, carried thereby, are continually being moved along the arcuate path above referred to. Since the bearing plates of the cap sections are maintained in constant contact with the body bolster surface 11, any pivotal movement of the truck relative to the railway vehicle will result in frictional forces being created on the cap section and body bolster intimate surfaces. These frictional forces tend to control the movement of the truck to materially reduce the above-mentioned nosing action thereof. If the cap bearing plates are arranged and constructed so that their contiguous or associated edges are parallel with or tangent to the path through which they are urged in service, as the cap plates bear against and move relative to the body bolster and thereby wear the engaged surface thereof, a ridge or rib will be formed on the body bolster between the associated edges of the cap plates. In order to prevent the formation of ridges on a body bolster, the cap bearing plates are formed so that when the sections are assembled to form a unitary cap their related or contiguous edges intersect a vertical plane passing through the axis of the side bearing. In the particular form of the invention under immediate consideration the free or meeting edges 12 of the cap bearing plates are convoluted or sinuously formed so that, beginning at one or the larger end of each cap plate, the related edge 12 is convex, as at 13, to merge with successive concaved and convexed turns, as at 14, and finally terminate in a concave arc or curve 15 at the other or smaller end thereof. When a plurality of thusly formed plates are associated the convoluted edges thereof will match or mate to present a complete or unitary cap upper bearing surface with the juncture between the section bearing plates out of alignment with any horizontal service movement of the side bearing, and accordingly no ridges or ribs will be formed on the body bolster. If desired, the concave and convex turns 14 may be eliminated and the arcs 13 and 15 enlarged or expanded so as to merge into one another to thereby form the cap section free edge as an ogee or S curve which will accomplish the same result as the illustrated edge 12.

Each cap section desirably comprises longitudinally spaced end flanges 16 and a connecting side flange 17, all of which depend from the section bearing plate to within the housing and terminate short of the housing base plate to permit a downward movement of the cap relative to the housing during a compressive movement of the side bearing. As will be noted by referring particularly to Figures 1 and 2 of the drawings, the cap end flanges 16 are spaced a slight distance inwardly of the housing from the end walls 6 thereof so as to afford sufficient clearance between the associated ends of the cap and housing for service movements of the cap.

Each cap section is provided with semi-cylindrical downwardly opening pockets 18 adjacent the longitudinal ends thereof. The pockets are formed by a merger of the end flanges with the associated side flange and a block or protuberance 19 projecting inwardly and downwardly of the cap from the side flange intermediate the ends thereof and the bearing plate, respectively. Since the side bearing is of the resilient compressible type there is provided therein a plurality of, preferably two, longitudinally spaced spring means characterized by the double coil or helical springs 20 which are positioned in the pockets 18 and react vertically against the multipart cap and housing. The springs are, therefore, arranged to resist a downward movement of the cap as well as urge the cap outwardly of the housing during service of the side bearing.

The block or protuberance of each cap section is cored to form a horizontally disposed compartment 21 which, when two cap sections are mated, forms a tubular or cylindrical receptacle for the accommodation of a horizontally disposed, coil or helical spring 22 which reacts against the cap section side flanges to urge them apart or transversely of the side bearing. The spring 22, tending to separate two related cap sections, thereby results in the side flanges of the cap being urged transversely of the side bearing into intimate contact with the housing side walls. It will, therefore, be noted that any vertical movement of the cap relative to the housing will result in frictional forces being created on the housing-cap engaging surfaces to thereby add to the capacity of the side bearing. Because the spring 22 reacts transversely of the side bearing and perpendicularly to the path of the side bearing in service, the spring will not be subjected to vibratory forces which might otherwise be subjected to if it were positioned so as to react longitudinally of the side bearing and in substantial alignment with the path through which the side bearing is urged.

Since the contiguous edges of the cap upper plates are spaced apart a predetermined amount to incorporate a desired degree of flexibility in the side bearing structure and thereby permit the cap sections to move relatively to one another in service without binding or creating abnormal stresses in the structure, means has been provided to seal the space between the edges and, in this manner, prevent grit or any foreign substance from entering the side bearing. For the accomplishment of this purpose the free edge 12 of each section upper plate is provided with a longitudinally extending, horizontally disposed groove, recess, relief or indenture 23 which opens or faces in a direction away from the corresponding section side flange. Occupying the grooves and secured therein by any method desired is a flexible ribbon or strip 24 formed of a rubber compound or any material which will flex and permit relative movement between the cap sections and still form a seal between the contiguous edges thereof. The strip spans the distance between the section edges and forms an adequate seal therebetween to keep any foreign substance out of the side bearing.

Outstanding from each section side flange, adjacent the lower edge thereof, are longitudinally spaced, transversely projecting integrally formed spuds, lugs or shoulders 25 which extend into suitable or accommodating apertures 26 in the related housing side wall. The apertures 26 are of greater extent than the associated lugs so as to permit a free service movement of the cap relative to the housing. Since the lugs extend into the plane of the side walls, they are adapted to engage the side walls at the upper limits of the accommodating apertures to thereby limit the expansive movement of the side bearing. It will be observed that the overall dimension laterally of the assembled cap, inclusive of the integrally formed shoulders, is in excess of the clear opening of the housing or the distance between the housing side walls, and in order to facilitate the assembly or disassembly of the side bearing the end flanges of each cap section, and particularly those portions thereof removed from the side flange, are provided with tapered or inclined surfaces 27 which reduce the width of the end flanges as the lower extremities thereof are approached. The sections are thereby arranged to be pivoted about a line adjacent the flexible ribbon 24 to draw their shoulder carrying extremities toward one another and to cause a decrease in the transverse overall dimension of the assembled sections and facilitate their being inserted into or withdrawn from the housing.

To assist in collapsing assembled sections and resisting the force exerted by the horizontally acting spring 22, an orifice 28 is provided in each section side wall, preferably in alignment with the compartment 21. The orifice in one section is also in alignment with the orifice in an associated section through which an assembly bolt 29 may extend. By referring to Figure 4 of the drawings, it will be noted that as the effective length of the bolt 29 is shortened, the spring 22 is compressed and the cap is collapsed to withdraw the shoulders 25 from the apertures 26. It will be noted that the shoulders are out of the plane of the housing side walls, and therefore the cap of Figure 4 may be easily withdrawn from the housing or, if desired, the effective length of the bolt may be lengthened to result in the spring 22 expanding and the shoulders being positioned in the housing apertures.

Depressions 30 in the section side flanges, adjacent or about the orifices 28, are formed by the presence of convex or cylindrical surfaces 31 which present rocking surfaces against which a bolt head and nut 32 may bear. The sections, in effect, roll on the bolt head and nut, permitting the bolt to adjust itself and more particularly the nut to be rotated as the sections are being collapsed or expanded. The housing side walls are bowed, relieved or have portions thereof removed, as at 33, to avoid an interference between the bolt head and nut and the housing when the bolt is being employed for the purpose intended. As will be appreciated, the bolt is only associated with the cap sections when it is desirous to assemble or disassemble the side bearing.

Manufacturing tolerances make it practically impossible to form a plurality of truck and body bolsters which, when mated or related, will have a constant distance between their side bearing accommodating surfaces 4 and 11. There are, therefore, variations in the distance between the surfaces 4 and 11 at the respective extremities of related bolsters. Since the compressive movement of the side bearing is predetermined, means has been provided so that this predetermined compressive movement of the side bearing may be retained irrespective of the distance between the confronting surfaces 4 and 11 of related bolsters. This means is characterized by shims or adjusting plates 34 positioned within the housing in subjacent relation to the vertically acting springs 20 and cap sections. By the application of the shims 34 the cap and supporting springs may be raised so that the predetermined compressive movement of the side bearing may be established; the number of shims employed being determined by the distance between confronting bolster surfaces upon application of each side bearing. By referring particularly to Figure 2 of the drawings, it will be noted that upon a downward movement of the cap the section flanges are arranged to engage the shims to arrest a continued compressive movement of the side bearing, thereby permitting the side bearing to function as a solid or non-compressible type and to resist a further approaching movement of the bolster surfaces 4 and 11.

Referring now to Figure 6 of the drawings, there is illustrated, in perspective, a cap 8$^a$ made up of a plurality of, preferably two, sections 9$^a$ which are a modified form of the cap sections of Figures 1 through 5 and may, if desired, be substituted therefor. Each cap section comprises an upper plate 10$^a$ adapted to bear against the body bolster surface 11 and longitudinally spaced end flanges 16$^a$ joined by a side flange 17$^a$ depending from adjacent the longitudinal and transverse edges, respectively, of the upper plate. In the present embodiment of the invention a free edge 12$^a$ of each section upper plate is made desirably straight and tapers or inclines transversely of the side bearing or across the face of the cap so as to be directed at an angular disposition to the path through which the side bearing will be urged in service. The edge 12, being angularly inclined to a vertical plane passing through the longitudinal axis of the side bearing, will, when two sections are related, dispose the juncture between mated sections so that ridges or ribs will not be formed on the engaged body bolster. Since the sections 9$^a$ are counterparts of one another, having one end of each upper plate of greater width and extent than the other end thereof, only one type of section need be manufactured, and two such sections can be associated or related to form a single or unitary cap.

Extending inwardly of each cap section from the side flange thereof are longitudinally spaced guide lugs 35 adapted to maintain the upper extremities of the coil springs 20 in a predetermined position. Protuberances 19$^a$ also extend inwardly from the section side flange and are spaced from the section end flanges to form pockets 18$^a$ therebetween for the accommodation of the coil springs 20. Joining the lower extremities of the end flanges and protuberances to the associated extremity of the section side flange are triangularly formed gussets 36 which function as reinforcing means for the section end flanges and protuberances. Interposed between the protuberances 19$^a$ and projecting inwardly from each section side flange are vertically spaced lugs or prongs 37 defining a space or compartment 21$^a$ therebetween for the accommodation of the transversely acting coil spring 22. Each cap section is, like the previously described section, provided with an outwardly opening or facing groove, recess or indenture 23ᵃ for the accommodation of a flexible ribbon or strip 24.

Referring now to Figures 7 and 8, there is illustrated a still further modified cap 8ᵇ made up of sections 9ᵇ, each of which has an upper plate 10ᵇ of sufficient horizontal extent to overlie the housing walls indicated by the reference 6ᵃ. The upper plate of each section under immediate consideration, by overlying the subjacent end and side walls of the housing, thereby prevents foreign substance from entering the bearing between the cap sections and the housing. The free edge 12ᵇ of each cap section is provided with a horizontally disposed groove, recess or relief 23ᵇ which terminates adjacent the longitudinal extremities of the cap in vertically directed channels 38. Occupying the grooves and channels of mated sections is a flexible ribbon or strip 24ᵇ formed of a rubber compound or any material which will flex to permit relative movement between the cap sections and still form a seal between contiguous edges thereof.

It will, of course, be noted that various changes and alterations may be made to the illustrated and described constructions without departing from within the spirit and scope of the appended claims since the species illustrated are merely exemplary forms of the invention.

I claim:

1. In a side bearing, the combination of a housing, a multipart cap interlocked with said housing and extending thereabove, vertically acting spring means interposed between said housing and cap for urging the latter outwardly of said housing, and horizontally acting spring means urging said cap into frictional engagement with said housing.

2. In a side bearing, the combination of a housing, a multipart cap positioned in and extending above said housing, spaced vertically acting spring means interposed between said housing and cap for urging the latter outwardly of said housing, and horizontally acting spring means urging said cap into frictional engagement with said housing, said cap having upper bearing plates with their contiguous edges intersecting the vertical plane passing through the longitudinal axis of said side bearing.

3. In a side bearing, the combination of a housing, a counterpart cap positioned in and extending above said housing, vertically acting spring means interposed between said housing and cap for urging the latter outwardly of said housing, and horizontally acting spring means urging said cap into intimate contact with said housing, said cap having upper bearing plates each with ends thereof being of different horizontal extent.

4. In a side bearing, the combination of a housing, a counterpart cap positioned in and extending above said housing, vertically acting spring means interposed between said housing and cap for urging the latter outwardly of said housing, and horizontally acting spring means urging said cap into intimate contact with said housing, said cap having upper bearing plates with sinuous contiguous edges.

5. In a side bearing, the combination of a housing, a multipart cap positioned in and extending above said housing, and resilient means within said housing for urging said cap outwardly of and into bearing relation with said housing, said cap having upper bearing plates each with ends thereof being of different horizontal extent.

6. In a side bearing, the combination of a housing, a multipart cap positioned in and extending above said housing, longitudinally spaced spring means urging said cap outwardly of said housing, and spring means acting transversely of said side bearing for urging said cap into engagement with said housing.

7. In a side bearing, the combination of a housing, a multipart cap positioned in and extending above said housing, resilient means within said side bearing for urging said cap outwardly of and into bearing relation with said housing, said housing being apertured intermediate its height, and means outstanding from and integral with said cap extending into said housing apertures for preventing a separation of said cap and housing.

8. In a side bearing, the combination of a housing, a multipart cap positioned in and extending above said housing, resilient means within said side bearing and urging all the parts of said cap outwardly of said housing, said housing having apertures intermediate its height, means integral with and outstanding from said cap parts adapted to extend into said housing apertures, the horizontal extent of said cap being greater than the clear opening of said housing, and means formed on said cap parts for facilitating assembly of said cap and housing.

9. In a side bearing, the combination of a housing, a multipart cap positioned in and extending above said housing, resilient means within said side bearing and urging all of the parts of said cap outwardly of said housing, each cap part having an upper bearing plate, and flexible means extending between contiguous edges of said cap plates to form a seal therebetween.

10. In a side bearing, the combination of a housing, a multipart cap positioned in and extending above said housing, resilient means within said bearing and urging all of the parts of said cap outwardly of said housing, each cap part having a bearing plate, and means positioned below an upper surface of said cap and extending between contiguous edges of said cap plates to form a seal therebetween.

11. In a side bearing, the combination of a housing, a multipart cap positioned in and extending above said housing, each part of said cap having a bearing plate, resilient means within said side bearing and urging all of said cap parts into engagement with and outwardly of said housing, grooves in adjacent portions of said cap bearing plates, and means positioned in said grooves and spanning contiguous extremities of said cap bearing plates to form a seal therebetween.

12. In a side bearing, the combination of an upwardly opening housing, a multipart cap positioned in and extending above said housing, each part of said cap having a bearing plate, a side flange depending from each bearing plate, spaced end flanges depending from each bearing plate, integral means outstanding from said side flanges, said housing having apertures for the accommodation of said integral means, said end flanges having surfaces inclined from adjacent the contiguous edges of cap part plates so as to facilitate assembly of said cap and housing, and spring means within said housing for urging said cap outwardly of said housing.

13. In a side bearing, the combination of an upwardly opening housing, a multipart cap positioned in and extending above said housing, each of the parts of said cap having an irregularly formed bearing plate, and spring means within said side bearing for urging said cap outwardly of said housing.

14. In a side bearing, the combination of an upwardly opening housing, a multipart cap positioned in and extending above said housing, each of the parts of said cap having an irregularly formed bearing plate, means associated with the contiguous extremities of said bearing plates to form a seal therebetween, and spring means within said side bearing for urging said cap outwardly of said housing.

15. In a side bearing, the combination of an upwardly opening housing, a multipart cap positioned in and extending above said housing, each of the parts of said cap having an irregularly formed bearing plate, means associated with the contiguous extremities of said bearing plates to form a seal therebetween, vertically acting spring means within said side bearing for urging said cap outwardly of said housing, and horizontally acting spring means for urging said cap parts into frictional engagement with said housing.

16. In a side bearing, the combination of a housing, a counterpart cap positioned in and extending out of said housing, said housing having apertures in walls thereof, said cap parts each having side and end flanges, means integral with and outstanding from said cap part side flanges to extend into said housing apertures, spring means reacting vertically against said housing and cap, spring means reacting horizontally against said cap parts for urging said cap into intimate contact with said housing side walls, and inclined surfaces on said cap flanges facing one another to facilitate assembling said cap and housing, said cap side flanges being apertured for the reception of means adapted to compress said horizontal reacting spring means and drawing said inclined surfaces closer to parallelism.

17. In a side bearing, the combination of a housing having spaced side walls joined by spaced end walls to define an opening therebetween, a counterpart cap positioned in said opening and extending above said housing, each cap part comprising a bearing plate, side and end flanges depending from each bearing plate, means formed integral with said side flanges extending into apertures formed in said housing side walls, and resilient means bearing against said cap side flanges to urge the latter into intimate contact with said housing side walls, said cap bearing plates being irregularly formed so that the line of demarcation therebetween will be out of alignment with the path through which the side bearing will travel in service.

18. In a multipart cap for use with a side bearing, the combination of a plurality of top plates having facing grooves along contiguous edges and means positioned in said grooves and spacing the distance between said contiguous edges to form a seal therebetween.

19. In a multipart cap for use with a side bearing, the combination of a plurality of top plates having horizontally disposed grooves along contiguous edges, and flexible means positioned in said grooves and spanning the distance between said contiguous edges to form a seal therebetween.

20. In a cap for use with a side bearing, the combination of a plurality of counterpart, irregularly formed top plates having flanges depending therefrom, grooves in said bearing plates positioned below an upper surface thereof, and flexible means positioned in said grooves and spanning contiguous edges of said top plates to form a seal therebetween.

EMIL H. BLATTNER.